United States Patent
Green et al.

(10) Patent No.: US 8,139,904 B2
(45) Date of Patent: Mar. 20, 2012

(54) METHOD AND APPARATUS FOR IMPLEMENTING OPTICAL DEFLECTION SWITCHING USING COUPLED RESONATORS

(75) Inventors: William M. Green, Astoria, NY (US); Fengnian Xia, New York, NY (US); Yurii Vlasov, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 11/856,838

(22) Filed: Sep. 18, 2007

(65) Prior Publication Data

US 2009/0304327 A1    Dec. 10, 2009

(51) Int. Cl.
*G02F 1/295* (2006.01)
*G02B 6/26* (2006.01)
*G02B 6/42* (2006.01)

(52) U.S. Cl. ............ 385/5; 385/4; 385/14; 385/15; 385/16; 385/18; 385/22; 385/31; 385/32; 385/129; 385/130

(58) Field of Classification Search .......... 385/4, 5, 385/22, 32
See application file for complete search history.

(56) References Cited

U.S. PATENT DOCUMENTS

| | | | | |
|---|---|---|---|---|
| 6,052,495 | A * | 4/2000 | Little et al. | 385/2 |
| 6,101,300 | A * | 8/2000 | Fan et al. | 385/27 |
| 6,130,969 | A * | 10/2000 | Villeneuve et al. | 385/27 |
| 6,195,187 | B1 * | 2/2001 | Soref et al. | 398/9 |
| 6,212,308 | B1 | 4/2001 | Donald | |
| 6,222,964 | B1 * | 4/2001 | Sadot et al. | 385/40 |
| 6,396,976 | B1 | 5/2002 | Little et al. | |
| 6,411,756 | B2 * | 6/2002 | Sadot et al. | 385/40 |
| 6,512,866 | B1 * | 1/2003 | Fan et al. | 385/27 |
| 6,580,851 | B1 * | 6/2003 | Vahala et al. | 385/30 |
| 7,065,276 | B2 * | 6/2006 | Scheuer et al. | 385/50 |
| 7,184,638 | B2 * | 2/2007 | Noda et al. | 385/129 |
| 7,224,862 | B2 * | 5/2007 | Noda et al. | 385/24 |
| 7,343,067 | B2 * | 3/2008 | Barwicz et al. | 385/32 |
| 7,421,168 | B1 * | 9/2008 | Goutzoulis | 385/50 |
| 7,466,883 | B2 * | 12/2008 | Bradley et al. | 385/30 |
| 2003/0159392 | A1 * | 8/2003 | Broek et al. | 52/656.7 |
| 2006/0051010 | A1 | 3/2006 | Chu et al. | |
| 2006/0197959 | A1 * | 9/2006 | Barwicz et al. | 356/470 |
| 2006/0228120 | A9 * | 10/2006 | McCallion et al. | 398/187 |

OTHER PUBLICATIONS

H. Takahashi et al.; PLC Optical Switch that Enhances the Optical Communication Network, NTT Technical Review vol. 3, No. 7, Jul. 2005; pp. 17-21.
Compact 16×16 optical matrix switch using PLC technology; Nippon Telegraph and Telephone Corporation; 2006.
Making the big step from electronic to photonics by modulating a beam of light with electricity, [online]; http://www.news.cornell.edu/stories/May05/LipsonElectroOpitcal.ws.html.

* cited by examiner

*Primary Examiner* — Ryan Lepisto
(74) *Attorney, Agent, or Firm* — Cantor Colburn LLP; Vazken Alexanian

(57) ABSTRACT

A method of implementing optical deflection switching includes directing a tuning operation at a specific region of coupled optical resonators coupled to an input port, a first output port and a second output port, the coupled optical resonator including a plurality of cascaded unit cells; wherein the tuning operation interrupts a resonant coupling between one or more of the unit cells of the coupled resonators so as to cause an input optical signal from the input port to be directed from the first output port to the second output port.

20 Claims, 3 Drawing Sheets

METHOD AND APPARATUS FOR IMPLEMENTING OPTICAL DEFLECTION SWITCHING USING COUPLED RESONATORS

STATEMENT OF GOVERNMENT INTEREST

This invention was made with U.S. Government support under DARPA/ONR grant No. N00014-04-C-0455. The U.S. Government has certain rights in this invention.

BACKGROUND

The present invention relates generally to optical switching techniques and, more particularly, to a method and apparatus for implementing optical deflection switching using coupled optical waveguide resonators.

Multi-core microprocessor architectures have been developed in order to mitigate increased power dissipation in high-performance computer chips. However, the bandwidth limitations for global electrical interconnections between various cores are rapidly becoming the major factor in restricting further scaling of total chip performance. One approach resolving this interconnect bottleneck is to transmit and route signals in the optical domain, since optical signals can provide both immense aggregate bandwidth and large savings in on-chip dissipated power.

Many existing types of optical switches fall under the category of microelectromechanical (MEMS) devices, in which tiny components such as prisms or mirrors are positionally adjusted in order to redirect input optical signals. However, such MEMS devices are not suited for multi-core chip scaling purposes. On the other hand, the field of integrated optics has expanded tremendously in recent years, and integrated optical device solutions are now being proposed for applications in a variety of fields including, for example, telecommunications, data communications, high performance computing, biological and chemical sensing, and radio frequency (RF) networks.

In this regard, an optical waveguide or combination of optical waveguides may be formed on an integrated circuit (IC) to form devices such as optical resonators, arrayed waveguide gratings, couplers, splitters, polarization splitters/combiners, polarization rotators, Mach-Zehnder (MZ) interferometers, multimode interference waveguides, gratings, mode transformers, delay lines, and optical vias. Such on-chip devices may in turn be used to create an integrated optical circuit or planar light wave circuit that performs one or more optical functions such as, for example: multiplexing/demultiplexing, optical add/drop, variable attenuation, switching, splitting/combining, filtering, spectral analysis, variable optical delay, clock distribution, amplitude/phase modulation, polarization rotation, comb generation, and dispersion compensation.

Although recent advances in silicon nanophotonics has improved the prospects for complementary metal oxide semiconductor (CMOS) compatible, on-chip networks for multi-core chips, there is still a need for a broadband, scalable optical switching methodology and structure that has low latency, low power dissipation and high throughput.

SUMMARY

The foregoing discussed drawbacks and deficiencies are overcome or alleviated, in an exemplary embodiment, by a method of implementing optical deflection switching, including directing a tuning operation at a specific region of coupled optical resonators coupled to an input port, a first output port and a second output port, the coupled optical resonators including a plurality of cascaded unit cells; wherein the tuning operation interrupts the resonant coupling between one or more of the unit cells of the coupled resonators so as to cause an input optical signal from the input port to be directed from the first output port to the second output port.

In another embodiment, an optical deflection switch apparatus includes coupled optical resonators formed on an integrated circuit substrate, the coupled optical resonators including a plurality of cascaded unit cells; an input port, a first output port and a second output port coupled to the coupled optical resonators; and a tuning mechanism is configured to introduce a tuning operation at a specific region of the coupled optical resonators, wherein the tuning operation interrupts a resonant coupling between one or more of the unit cells of the coupled resonators so as to cause an input optical signal from the input port to be directed from the first output port to the second output port.

BRIEF DESCRIPTION OF THE DRAWINGS

Referring to the exemplary drawings wherein like elements are numbered alike in the several Figures.

DETAILED DESCRIPTION

Disclosed herein is a method and apparatus for implementing optical deflection switching using coupled resonators. Briefly stated, the present embodiments implement an optical switching solution in which an input optical signal is selectively switched so as to be routed between a dropping port and a through port, depending upon whether at least one of the optical resonators in a series of coupled resonators (e.g., a multiple-unit, ring shaped optical resonator) is tuned in a manner so as disturb or interrupt the resonant coupling between the individual units of the compound resonator. By deactivating the source of the tuning, the resonant coupling between the individual units of the compound resonators is then restored, thus switching the output path of the input optical signal back to the dropping port (or the through port, depending upon how the ports are defined). Stated more generally, the coupled resonator switches the path of an input optical signal between a first output port and a second output port when tuned by the application of a tuning operation thereto, and vice versa when the tuning operation is removed.

Advantageously, the optical characteristics of only one unit cell of the coupled optical resonators (or one coupling region between a pair of unit cells) need be altered by the tuning operation in order to interrupt the resonant coupling between the units. Consequently, the device area and power used for tuning of the switch may be reduced since the tuning need not be directed to the entire unit structure of the coupled resonators. More generally, so long as the tuning mechanism/operation utilized does not alter all of the resonator unit cells in the same manner with respect to one another, the resonant coupling therebetween will be disturbed, as described in further detail hereinafter. As also described herein, the present optical switching approach can also be used to simultaneously switch input optical signals within multiple passbands.

Optical resonators are optical cavities supporting standing or traveling wave resonant optical modes. Examples of optical resonator waveguides include an optical waveguide curved in a form of a disk geometry, ring geometry, ellipse geometry, or racetrack geometry. Optical resonator waveguides having the ring geometry are the most commonly studied resonator cavity for integrated optical devices, with a set of resonance wavelengths determined by the radius and effective index of the cavity. Optical resonators may be used singly or, alternatively, in multiple units so as to form coupled optical resonators of higher order cascades (e.g., 3, 5, etc.).

Figure 1A:
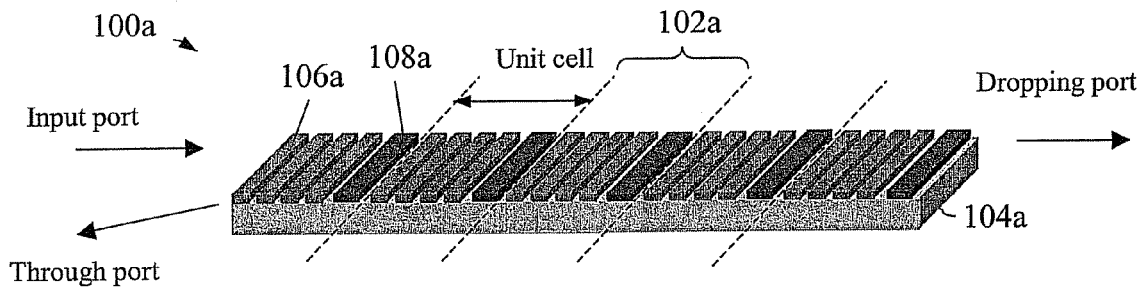
FIGS. 1(a) through 1(c) are schematic diagrams of exemplary coupled optical resonators suitable for use in accordance with an embodiment of the invention.
Figure 1B:
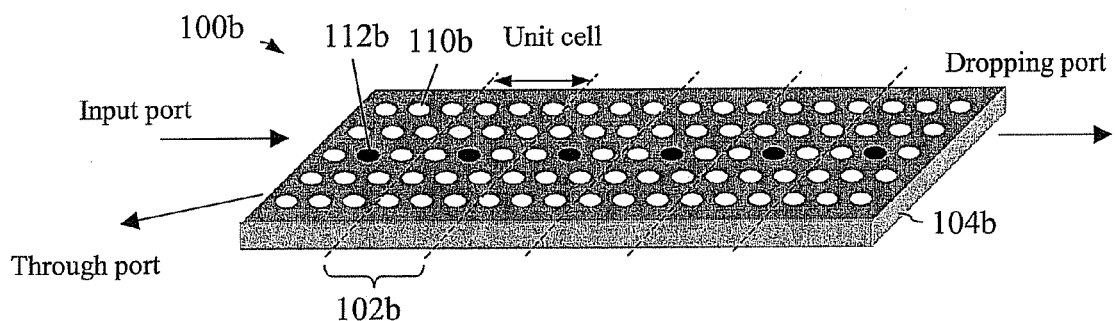
Figure 1C:
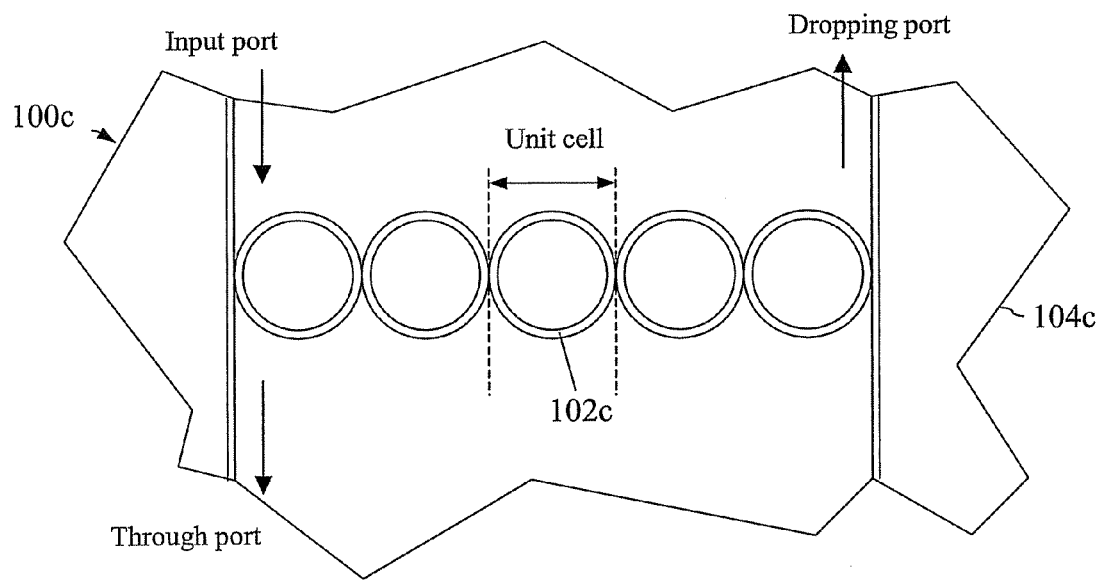

Referring initially to FIGS. 1(a) through 1(c), there are shown schematic diagrams of various examples of coupled optical resonators (100a, 100b, 100c, respectively) suitable for use in accordance with an embodiment of the invention. In FIG. 1(a), the coupled resonator 100a includes a plurality of cascaded individual resonators 102a (which are also referred to herein as "unit cells") formed on a substrate 104a, which may also serve as an optical waveguide. In this particular example, each unit cell 102a includes a plurality of individual ridges 106a and at least one other ridge 108a, which has a different optical property (e.g., size, material) with respect to ridges 106. Similarly, the coupled resonator 100a of FIG. 1(b) includes a plurality of cascaded individual resonators or unit cells formed on a substrate 104b, which again may also serve as an optical waveguide. In this embodiment, each unit cell 102b includes a plurality of individual features such as holes 110a formed in the substrate 104b, and at least one other feature 112b, which has a different optical property (e.g., a hole filled with a material) with respect to holes 106.

FIG. 1(c) illustrates coupled resonators 100c having a ring-shaped geometry as described above, wherein each unit cell 102c includes a ring of a material (e.g., silicon) formed on a substrate 104c. The resonance properties of the unit cells 102 are determined by the ring-shaped geometry itself.

Each of the coupled resonators 100a, 100b, 100c described above is configured for used as a space-type switch, which is characterized by multiple input/output ports to redirect optical signals (as opposed to a gate-type switch having one input port and one output port to switch the optical signal on and off). More specifically, the coupled resonators 100a, 100b, 100c are coupled to an input port, a through port and a dropping port. Depending upon whether the resonator is tuned, an input optical signal is directed through one of the through port or the dropping port. By way of example, it is assumed herein that when the coupled resonator is not tuned (i.e., the effective refractive index of each unit cell remains constant with respect to one another, and hence the resonant coupling therebetween is undisturbed) the optical signal is directed to the dropping port. Conversely, when the coupled resonator is tuned (i.e., the effective refractive index of at least one unit cell is altered with respect to the others, and hence the resonant coupling therebetween is disturbed) the optical signal is directed to the through port. It should be appreciated however, that the directions could also be reversed by changing the definitions of the dropping and through ports or the initial operational condition.

Figure 2:
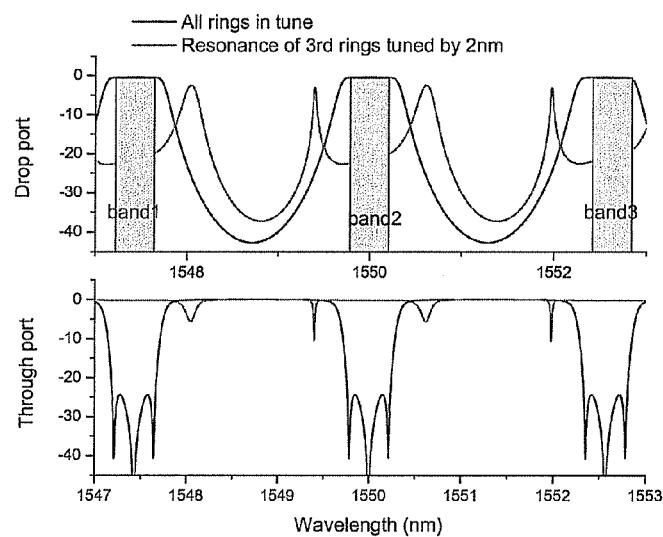
FIG. 2 is a graph illustrating the operation of the embodiment of FIG. 1(c) as a space-type optical switch.

FIG. 2 is a graph illustrating the operation of the embodiment of FIG. 1(c) as a space-type optical switch. In this example, tuning is accomplished by affecting the resonance properties of one of the unit cells 102c or rings (e.g., the third ring) of the resonator 100c. As used herein, the term "tuning" may refer to an operation that is known to affect the effective refractive index of a unit cell of the coupled resonator with respect to the others such as, for example, by thermal effects (e.g., heating), electrooptic effects, carrier injection, and other optical tuning methods known in the art.

As specifically shown in the top portion of the graph, there are a plurality of pass bands in the near infrared (NIR) spectrum through the drop port when all of the unit cells of the coupled resonator are in tune with one another (i.e., the resonant coupling between the cascaded unit cells remains undisturbed). Correspondingly, the bottom portion of the graph depicts transmission spectra in the through port. However, when the resonance of one of the rings (e.g., the third ring) is individual tuned, the resonant coupling between the unit cells is disturbed. As a result, it is seen from the top portion of the graph that the pass bands are now attenuated in the drop port, and are instead passed through the through port in the bottom portion of the graph of FIG. 2.

Figure 3:
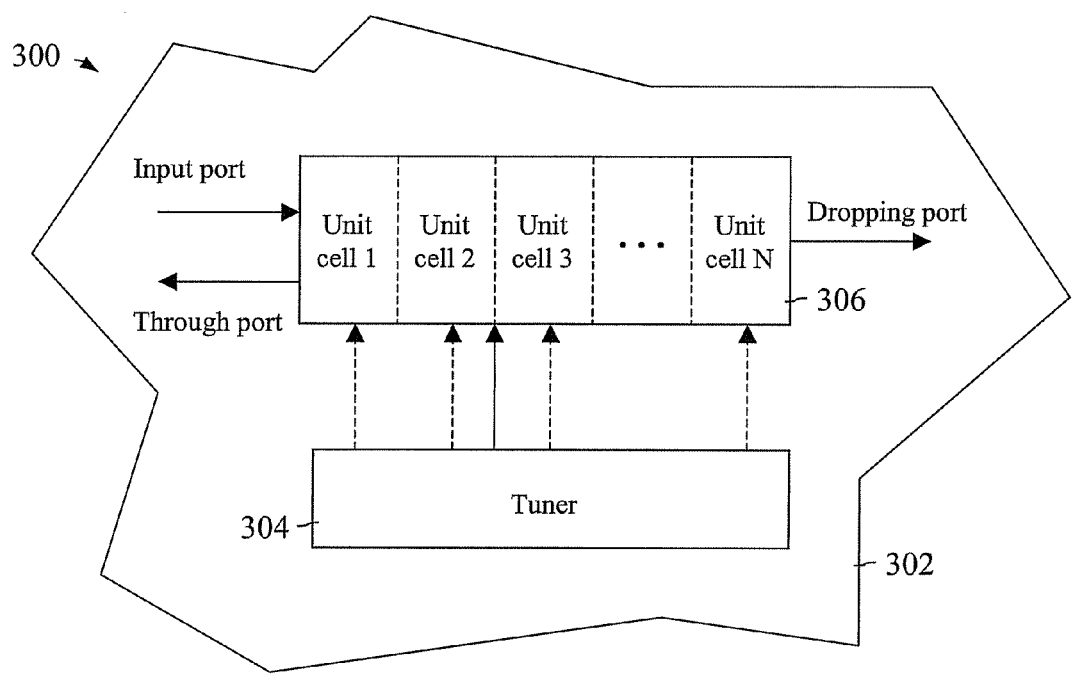
FIG. 3 is a schematic diagram of an apparatus for implementing optical deflection switching using coupled resonators, in accordance with an embodiment of the invention.

FIG. 3 is a schematic diagram of an apparatus 300 for implementing optical deflection switching using coupled waveguide resonators, in accordance with an embodiment of the invention. The switching apparatus is formed on an integrated circuit substrate 302 such as, for example, silicon. A tuner 304 formed on the substrate is configured to selectively apply a tuning operation to one or more of a plurality of unit cells (Unit Cell 1, . . . Unit Cell N) of a cascaded optical resonator 306 that is coupled to an input port, a dropping port, and a through port. As indicated above, the tuner 304 can include any suitable device known in the art for changing the effective refractive index of an optical waveguide including, but not limited to, resistive heating devices optical heating devices, carrier injection devices and optical tuning devices. In one specific example, an estimated free carrier concentration of about $10^{19}$ $cm^3$ may be achieved by carrier injection in an integrated PIN diode by appropriate doping of the silicon waveguide.

As will also be noted from FIG. 3, the tuner 304 may be configured to selectively disturb the resonant coupling between the unit cells in any of a number of ways. However, one economical way of carrying this out is to focus the tuning operation on just one of any of the N unit cells (as indicated by the dashed arrows) or by focusing the tuning operation on a coupling region or junction of adjacent unit cells (as indicated by the solid arrow). Other possibilities are also contemplated for the tuning operation (e.g., changing the effective refractive index of all but one of the unit cells), so long as the applied index of refraction change does not affect all of the cells in the same manner. Otherwise, where the same index change is applied to all unit cells, the resonant coupling between the unit cells in the coupled resonator is not actually disturbed; rather, the resonator merely acts as a tunable filter in this instance to pass a different band(s) through the drop port, and not act as a space-type switch.

Figure 4:
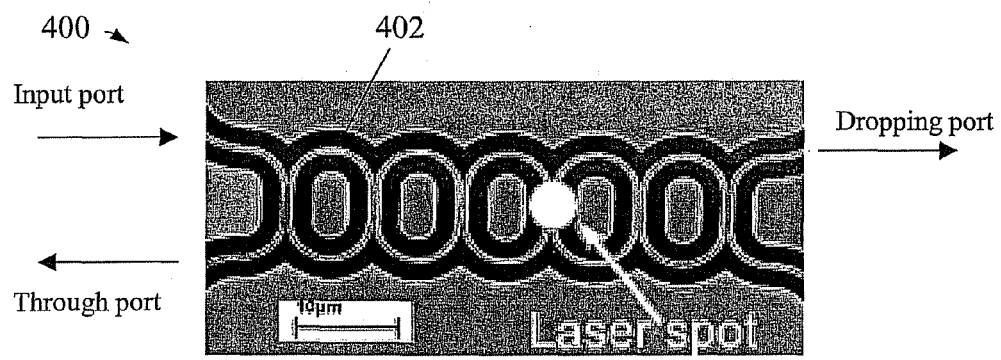
FIG. 4 is a scanning electron micrograph (SEM) image of 5 coupled optical resonators based on silicon photonic wire waveguides on silicon-on-insulator (SOI) substrate.

FIG. 4 is a scanning electron micrograph (SEM) image of a $5^{th}$ order ring resonator 400 fabricated on silicon-on-insulator (SOI) substrate. The coupled resonator 400 is characterized by a 1 dB flat-top pass band of over 310 GHz with ripples smaller than 0.2 dB, and an out-of-band rejection ratio of over 40 dB. The bending radii of the unit cells 402 is as small as 4 microns so as to allow scaling of the entire resonator device down to about 30×10 μm², as well as to obtain a large free-spectral range around 18 nm. In the exemplary resonator 400 shown in FIG. 4, tuning is implemented by positioning a laser excitation spot as shown (at the coupling between the third and fourth rings) to switch the optical path from the dropping port to the through port.

Figures 5A, 5B:
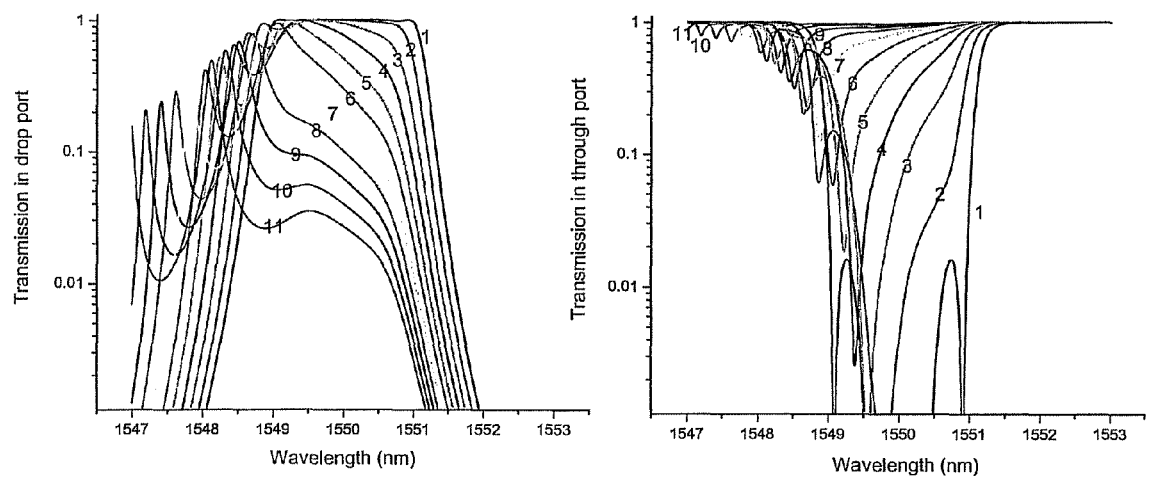
FIG. 5(a) is a graph depicting calculated dropping port transmission spectra (single pass band) of the coupled resonators of FIG. 4 as the effective index at the laser spot is increasingly changed.
FIG. 5(b) is a graph depicting through port transmission spectra (single passband) of the coupled resonators of FIG. 4 as the effective index at the laser spot is increasingly changed.

Referring next to FIGS. 5(*a*) and 5(*b*), the pair of graphs shown therein illustrate the switching effects of the resonator 400 as the tuning (changing) of effective index of refraction in the excited region of the resonator is shifted from 0 to 0.03, in increments of 0.003. FIG. 5(*a*) depicts transmission curves of a transmission spectrum through the dropping port as the effective index is increasingly changed, while FIG. 5(*b*) depicts the corresponding transmission curves through the through port. As is shown, where no laser energy is applied (curve 1 in both figures), the effective index remains unchanged, and the pass band wavelengths are passed through the dropping port, and are essentially blocked through the through port.

Then, as more power is applied by the laser, the effective index at the targeted region of the resonator is gradually increased in increments of 0.003 as reflected in curves 2 through 11 of FIGS. 5(*a*) and 5(*b*), wherein the last pair of curves 11 represents an index change of 0.03. As is shown, the increase in effective index begins to disturb the resonant coupling in the resonator and gradually blocks transmission of the pass band through the drop port, while passing the band through the through port.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of implementing optical deflection switching, the method comprising:
   directing a deactivatable tuning operation only at a specific region of a coupled optical resonator, the coupled optical resonator coupled to an input port, a first output port and a second output port, and the coupled optical resonator including at least three cascaded unit cells, wherein a first of the at least three cascaded unit cells is directly adjacent the input port and the first output port, a last of the at least three cascaded unit cells is directly adjacent the second output port, and at least one other of the at least three cascaded unit cells is disposed between the first and the last of the unit cells, not directly adjacent any of the input port or first and second output ports;
   wherein the tuning operation interrupts a resonant coupling between one or more of the at least three unit cells of the coupled resonator so as to cause an input optical signal from the input port to be directed from the first output port to the second output port; and
   the specific region comprises one of:
      a coupling junction between a pair of the at least three unit cells not directly adjacent any of the input port or first and second output ports; and
      one of the at least three unit cells not directly adjacent any of the input port or first and second output ports.

2. The method of claim 1, wherein the tuning operation causes a change in effective index of refraction of the region of the coupled optical resonator so as to interrupt the resonant coupling between one or more of the at least three unit cells.

3. The method of claim 1, wherein the coupled optical resonator comprises a ring-shaped geometry.

4. The method of claim 3, wherein the coupled optical resonator is formed on an integrated circuit substrate.

5. The method of claim 1, wherein the tuning operation is selected to produce one or more of thermal effects, electrooptic effects, and carrier injection within the region of the coupled optical resonator.

6. The method of claim 5, wherein the tuning operation comprises carriers supplied from one of a PIN diode and photons from a laser source.

7. The method of claim 1, wherein the input optical signal comprises a plurality of passbands.

8. The method of claim 1, wherein each of the at least three unit cells comprises a plurality of individual ridges and at least one additional ridge having a different optical property with respect to the plurality of individual ridges.

9. The method of claim 1, wherein each of the at least three unit cells comprises a plurality of individual holes formed in an integrated circuit substrate and at least one additional filled hole formed in the substrate having a different optical property with respect to the plurality of individual holes.

10. An optical deflection switch apparatus, comprising:
    a coupled optical resonator formed on an integrated circuit substrate, the coupled optical resonator including at least three cascaded unit cells;
    an input port, a first output port and a second output port coupled to the coupled optical resonator, wherein a first of the at least three cascaded unit cells is directly adjacent the input port and the first output port, a last of the at least three cascaded unit cells is directly adjacent the second output port, and at least one other of the at least three cascaded unit cells is disposed between the first and the last of the unit cells, not directly adjacent any of the input port or first and second output ports; and
    a deactivatable tuning mechanism configured to direct a tuning operation only at a specific region of the coupled optical resonator, wherein the tuning operation interrupts a resonant coupling between one or more of the at least three unit cells of the coupled resonator so as to cause an input optical signal from the input port to be directed from the first output port to the second output port;
    wherein the specific region comprises one of
       a coupling junction between a pair of the at least three unit cells not directly adjacent any of the input port or first and second output ports; and
       one of the at least three unit cells not directly adjacent any of the input port or first and second output ports.

11. The apparatus of claim 10, wherein the tuning operation causes a change in effective index of refraction of the region of the coupled optical resonator so as to interrupt the resonant coupling between one or more of the at least three unit cells.

12. The apparatus of claim 10, wherein the coupled optical resonator comprises a ring-shaped geometry.

13. The apparatus of claim 10, wherein the tuning mechanism is formed on the integrated circuit substrate.

14. The apparatus of claim 13, wherein the tuning mechanism comprises a PIN diode.

15. The apparatus of claim 10, wherein the tuning mechanism comprises a laser source.

16. The apparatus of claim 10, wherein the input optical signal comprises a plurality of passbands.

17. The apparatus of claim 10, wherein each of the at least three unit cells comprises a plurality of individual ridges and at least one additional ridge having a different optical property with respect to the plurality of individual ridges.

18. The apparatus of claim 10, wherein each of the at least three unit cells comprises a plurality of individual holes formed in the substrate and at least one additional filled hole formed in the substrate having a different optical property with respect to the plurality of individual holes.

19. A method of implementing optical deflection switching, the method comprising:
    directing a timing operation only at a specific region of a coupled optical resonator, the coupled optical resonator coupled to an input port, a first output port and a second output port, and the coupled optical resonator including at least three cascaded unit cells, wherein a first of the at least three cascaded unit cells is directly adjacent the input port and the first output port, a last of the at least three cascaded unit cells is directly adjacent the second output port, and at least one other of the at least three cascaded unit cells is disposed between the first and the last of the unit cells, not directly adjacent any of the input port or first and second output ports;
    wherein the tuning operation interrupts a resonant coupling between one or more of the at least three unit cells of the coupled resonator so as to cause an input optical signal from the input port to be directed from the first output port to the second output port; and
    removing the tuning operation so as to restore the resonant coupling between the one or more of the at least three unit cells and cause the input optical signal from the input port to be directed from the second output port back to the first output port;
    the specific region comprises one of:
        a coupling junction between a pair of the at least three unit cells not directly adjacent any of the input port or first and second output ports; and
        one of the at least three unit cells not directly adjacent any of the input port or first and second output ports; and
    wherein the tuning operation causes a change in effective index of refraction of the region of the coupled optical resonator so as to interrupt the resonant coupling between one or more of the at least three unit cells.

20. An optical deflection switch apparatus, comprising:
    a coupled optical resonator formed on an integrated circuit substrate, the coupled optical resonator including at least three cascaded unit cells;
    an input port, a first output port and a second output port coupled to the coupled optical resonator, wherein a first of the at least three cascaded unit cells is directly adjacent the input port and the first output port, a last of the at least three cascaded unit cells is directly adjacent the second output port, and at least one other of the at least three cascaded unit cells is disposed between the first and the last of the unit cells, not directly adjacent any of the input port or first and second output ports; and
    a tuning mechanism configured to direct a tuning operation only at a specific region of the coupled optical resonator, wherein the tuning operation interrupts a resonant coupling between one or more of the at least three unit cells of the coupled resonator so as to cause an input optical signal from the input port to be directed from the first output port to the second output port;
    wherein the specific region comprises one of:
        a coupling junction between a pair of the at least three unit cells not directly adjacent any of the input port or first and second output ports; and
        one of the at least three unit cells not directly adjacent any of the input port or first and second output ports;
    wherein the tuning operation causes a change in effective index of refraction of the region of the coupled optical resonator so as to interrupt the resonant coupling between one or more of the at least three unit cells; and
    wherein removal of the tuning operation restores the resonant coupling between the one or more of the at least three unit cells and causes the input optical signal from the input port to be directed from the second output port back to the first output port.

* * * * *